(12) United States Patent
Abe et al.

(10) Patent No.: US 12,542,327 B2
(45) Date of Patent: Feb. 3, 2026

(54) BATTERY MODULE AND BATTERY UNIT

(71) Applicant: PRIME PLANET ENERGY & SOLUTIONS, INC., Tokyo (JP)

(72) Inventors: Kosyo Abe, Himeji (JP); Takahide Takeda, Himeji (JP); Keiichiro Kobayashi, Nisshin (JP); Makoto Ochi, Myouzai-gun (JP); Mio Takeno, Miki (JP); Yasushi Tsuchida, Nisshin (JP); Masaki Koike, Nagoya (JP); Koji Watanabe, Okazaki (JP); Seiichi Sakuramoto, Kobe (JP); Yuzo Suzuki, Kariya (JP); Yasuo Ikeda, Toyota (JP); Kosuke Iwase, Konan (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 590 days.

(21) Appl. No.: 18/051,904

(22) Filed: Nov. 2, 2022

(65) Prior Publication Data

US 2023/0170572 A1   Jun. 1, 2023

(30) Foreign Application Priority Data

Nov. 17, 2021 (JP) ................................ 2021-187140

(51) Int. Cl.
*H01M 50/264* (2021.01)
*H01M 10/6566* (2014.01)
(Continued)

(52) U.S. Cl.
CPC ...... *H01M 50/264* (2021.01); *H01M 10/6566* (2015.04); *H01M 50/209* (2021.01); *H01M 50/271* (2021.01)

(58) Field of Classification Search
None
See application file for complete search history.

(56) References Cited

U.S. PATENT DOCUMENTS

2011/0076521 A1   3/2011   Shimizu et al.
2013/0252063 A1   9/2013   Park
(Continued)

FOREIGN PATENT DOCUMENTS

EP          3902025 A1    10/2021
JP       2008-066093 A     3/2008
(Continued)

*Primary Examiner* — Carlos Barcena
(74) *Attorney, Agent, or Firm* — Finnegan, Henderson, Farabow, Garrett and Dunner, LLP (57) ABSTRACT

Each of a plurality of units includes a plurality of battery cells and a supporting member. The plurality of battery cells are arranged side by side in the first direction and each of the plurality of battery cells has a prismatic shape. The supporting member supports the plurality of battery cells. Each of the plurality of battery cells has a housing having an upper surface on which an electrode terminal is disposed and a lower surface facing the upper surface along a second direction orthogonal to the first direction. When each of the plurality of units is placed on the first plane, the supporting member is capable of supporting the plurality of battery cells such that the second direction is substantially parallel to a normal direction of the first plane and the electrode terminal is oriented in a direction away from the first plane.

19 Claims, 9 Drawing Sheets

(51) Int. Cl.
*H01M 50/209* (2021.01)
*H01M 50/271* (2021.01)

(56) References Cited

U.S. PATENT DOCUMENTS

| | | |
|---|---|---|
| 2016/0149180 A1 | 5/2016 | Tokoo et al. |
| 2016/0190526 A1* | 6/2016 | Yamada .............. H01M 50/264 180/68.5 |
| 2018/0034014 A1* | 2/2018 | Ichikawa .............. H01M 50/30 |
| 2020/0194750 A1 | 6/2020 | Kawano |
| 2021/0083242 A1 | 3/2021 | Matsuta et al. |

FOREIGN PATENT DOCUMENTS

| | | |
|---|---|---|
| JP | 2011-076936 A | 4/2011 |
| JP | 2012-156014 A | 8/2012 |
| JP | 2014-186864 A | 10/2014 |
| JP | 2015-191770 A | 11/2015 |
| JP | 2021-044212 A | 3/2021 |
| KR | 10-1255250 B1 | 4/2013 |
| WO | WO 2013-080338 A1 | 6/2013 |
| WO | WO 2013/098982 A1 | 7/2013 |
| WO | WO 2014/203694 A1 | 12/2014 |
| WO | WO 2019/021779 A1 | 1/2019 |

* cited by examiner

BATTERY MODULE AND BATTERY UNIT

This nonprovisional application is based on Japanese Patent Application No. 2021-187140 filed on Nov. 17, 2021, with the Japan Patent Office, the entire contents of which are hereby incorporated by reference.

BACKGROUND OF THE INVENTION

Field of the Invention

The present technology relates to a battery module and a battery unit.

Description of the Background Art

WO 2013/080338 is a prior art document that discloses a configuration of a battery module. The battery module described in WO 2013/080338 includes a battery block and a housing. The battery block has a plurality of battery cells arranged therein and is accommodated in the housing. Each of the battery cells includes an electrode group, a prismatic container, and a battery cover. The electrode group has a positive electrode external terminal and a negative electrode external terminal. The prismatic container accommodates the electrode group. The positive electrode external terminal and the negative electrode external terminal are placed on the battery cover, and the battery cover seals the prismatic container. The prismatic container has a bottom surface facing the battery cover.

SUMMARY OF THE INVENTION

In the battery module in WO 2013/080338, the battery cell cannot be freestanding when the lower surface facing the upper surface on which the electrodes of the battery cell are provided serves as an installation surface, with the result that it may be difficult to maintain an upright state of the battery cell in a manufacturing process.

The present technology has been made to solve the above-described problem and has an object to provide a battery module and a battery unit in each of which an upright state of a battery cell can be maintained readily in a manufacturing process.

A battery module according to the present technology includes a plurality of units and a restraint member. The plurality of units are arranged side by side in a first direction. The restraint member restrains the plurality of units in the first direction. Each of the plurality of units includes a plurality of battery cells and a supporting member. The plurality of battery cells are arranged side by side in the first direction and each of the plurality of battery cells has a prismatic shape. The supporting member supports the plurality of battery cells. Each of the plurality of battery cells has a housing having an upper surface on which an electrode terminal is disposed and a lower surface facing the upper surface along a second direction orthogonal to the first direction. The supporting member is capable of supporting the plurality of battery cells such that when each of the plurality of units is placed on a first plane, the second direction is substantially parallel to a normal direction of the first plane and the electrode terminal is oriented in a direction away from the first plane.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

It should be noted that in the present specification, the terms "comprise", "include", and "have" are open-end terms. That is, when a certain configuration is included, a configuration other than the foregoing configuration may or may not be included. Further, the present technology is not limited to one that necessarily exhibits all the functions and effects stated in the present embodiment.

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

It should be noted that in the figures, a stacking direction of battery cells is defined as a first direction serving as a Y direction, a direction in which upper and lower surfaces of each battery cell are arranged face to face is defined as a second direction serving as a Z direction, and a direction in which two electrode terminals of the battery cell are arranged side by side is defined as a third direction serving as an X direction.

Figure 1:
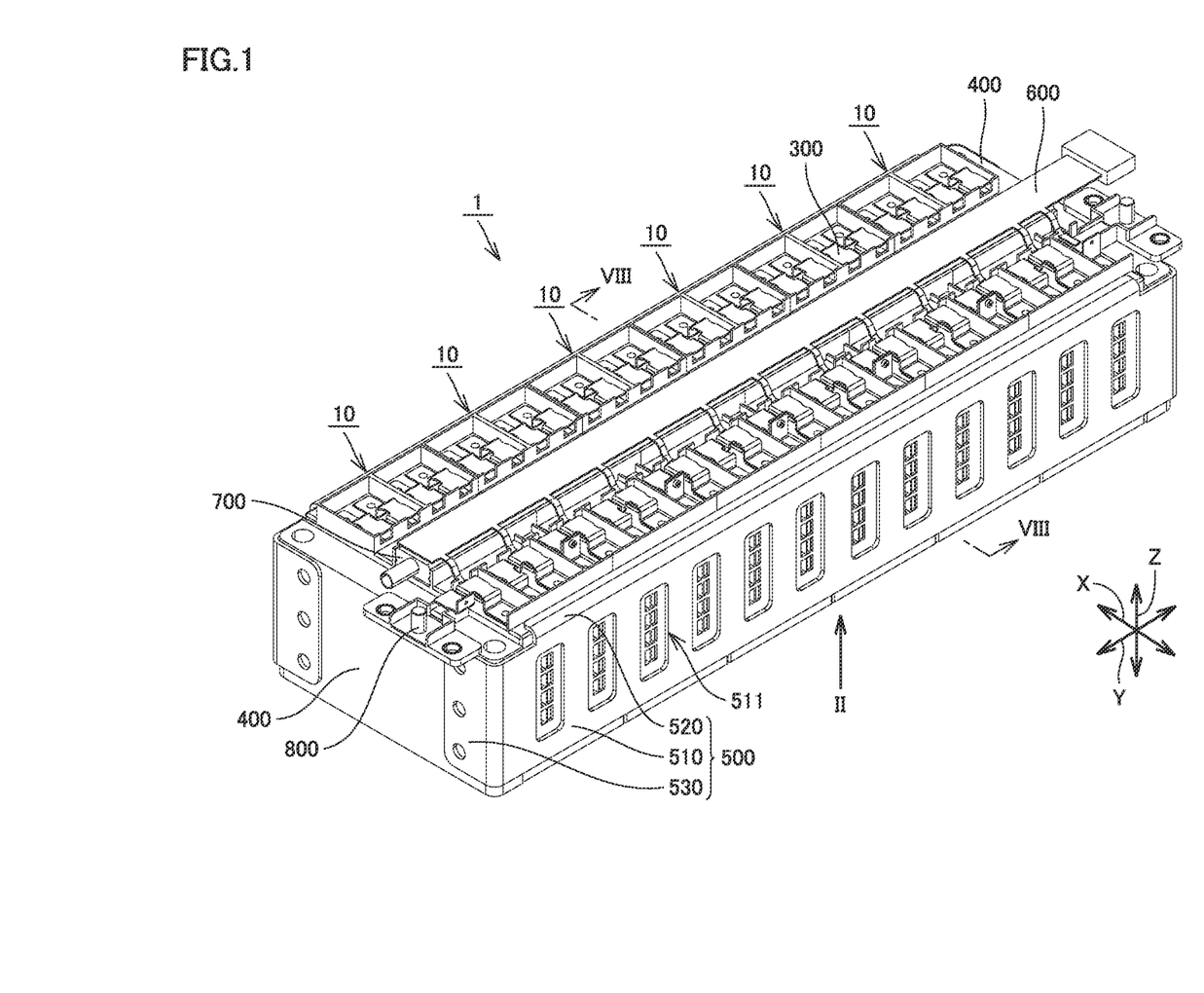
FIG. 1 is a perspective view showing a configuration of a battery module according to one embodiment of the present technology.
Figure 2:
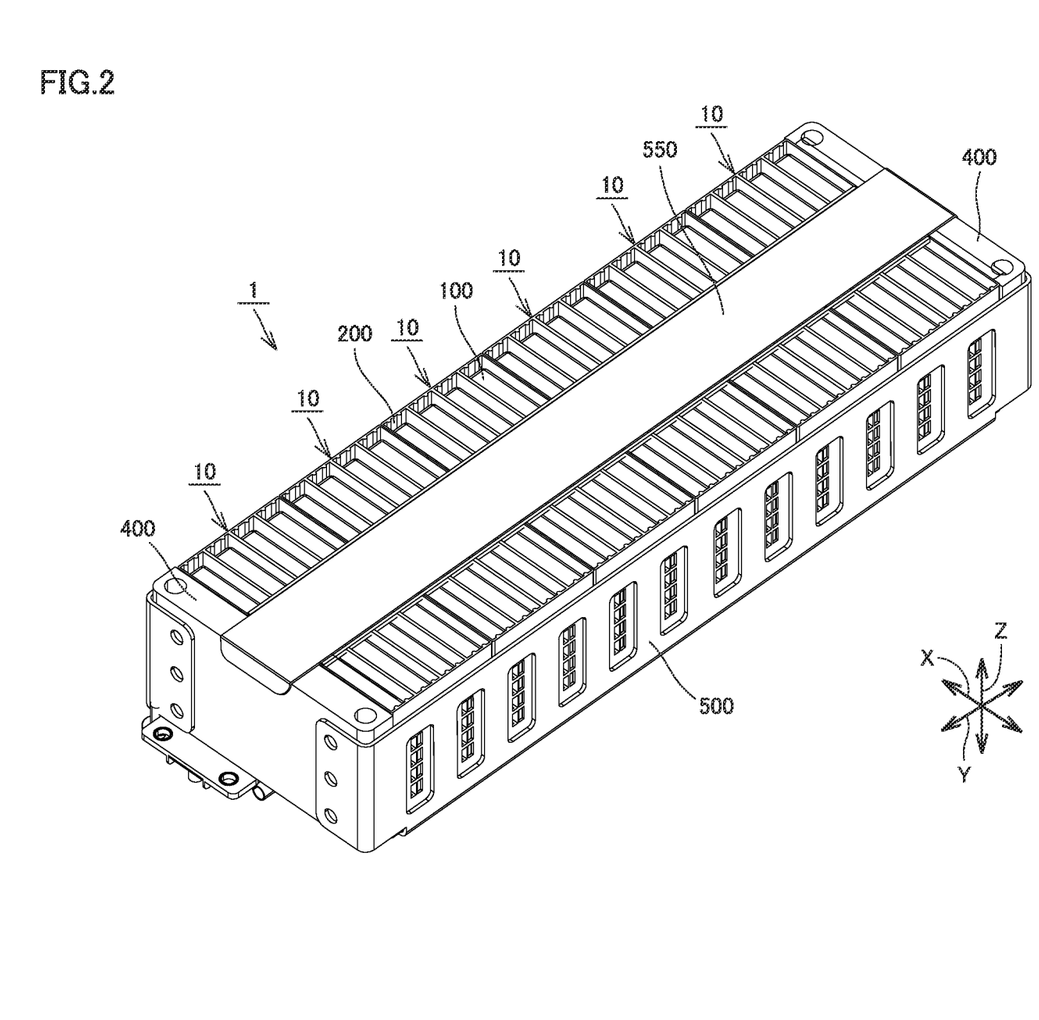
FIG. 2 is a perspective view of the battery module of FIG. 1 when viewed in a direction of an arrow II.
Figure 3:
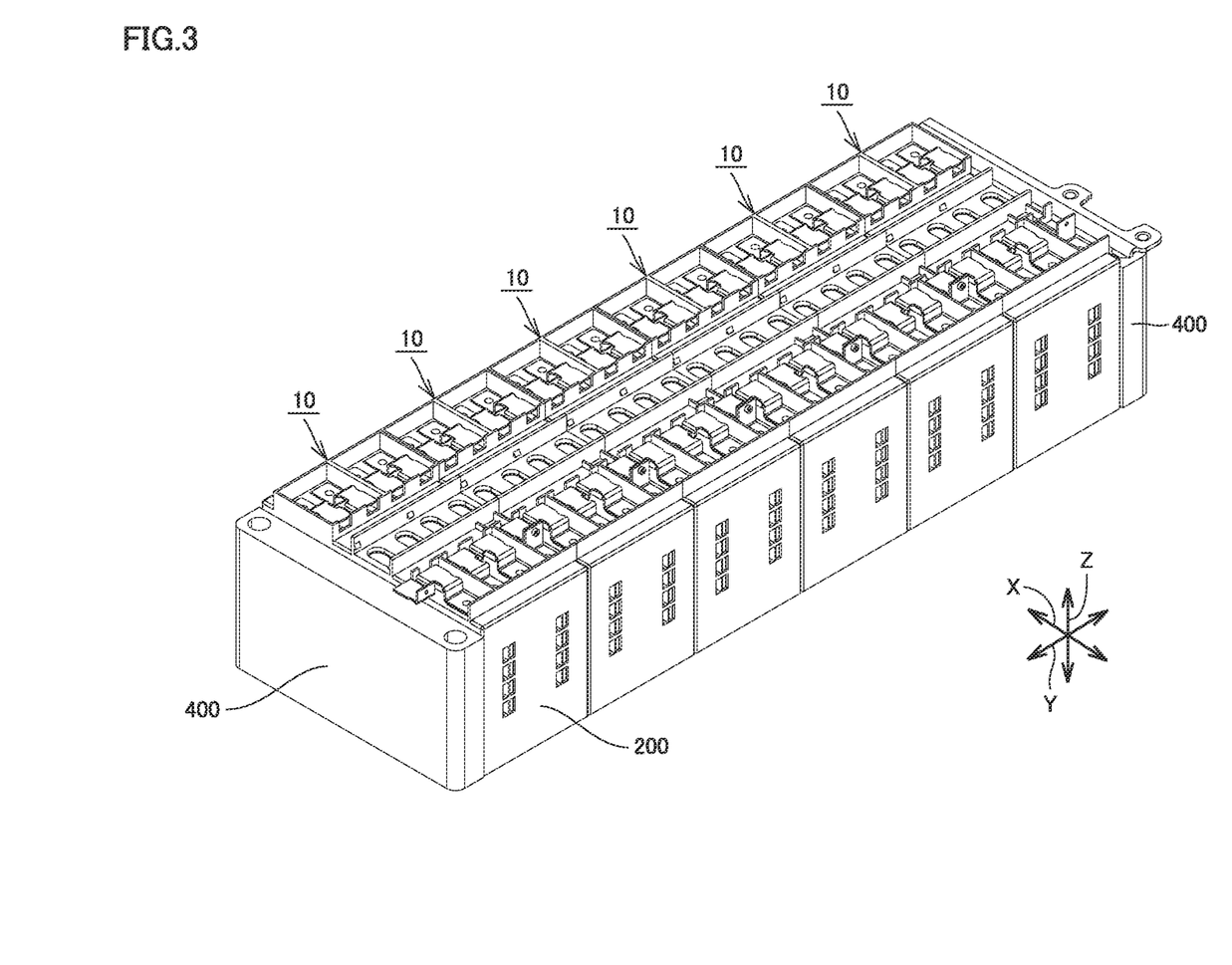
FIG. 3 is a perspective view showing configurations of a unit and end plates included in the battery module according to the embodiment of the present technology.

FIG. 1 is a perspective view showing a configuration of a battery module according to one embodiment of the present technology. FIG. 2 is a perspective view of the battery module of FIG. 1 when viewed in a direction of an arrow II. FIG. 3 is a perspective view showing configurations of a unit and end plates included in the battery module according to the embodiment of the present technology.

A battery module 1 is used as a power supply for driving a vehicle such as a hybrid electric vehicle (HEV), a plug-in hybrid electric vehicle (PHEV), or a battery electric vehicle (BEV), for example.

First, an overall structure of battery module 1 will be described. As shown in FIGS. 1 to 3, battery module 1 includes a plurality of units 10 and restraint members 500. Battery module 1 according to the embodiment of the present technology further includes end plates 400, a lower restraint member 550, a wiring member 600, a duct 700, and connection terminals 800.

The plurality of units 10 are arranged side by side in the first direction (Y direction) Six units 10 are arranged side by side in the Y direction as the plurality of units 10 according to the present embodiment. It should be noted that the number of the plurality of units 10 is not particularly limited as long as two or more units 10 are included.

The plurality of units 10 are sandwiched between two end plates 400. The plurality of units 10 according to the present embodiment are pressed by end plates 400 and restrained between two end plates 400.

End plates 400 are provided at the both ends beside the plurality of units 10 in the Y direction. Each of end plates 400 is fixed to a base such as a pack case that accommodates battery module 1. End plate 400 is composed of, for example, aluminum or iron.

Restraint members 500 are provided on both sides beside the plurality of units 10 and end plates 400 in the X direction. When restraint members 500 are engaged with end plates 400 with compressive force in the Y direction being applied to the plurality of units 10 arranged side by side and to end plates 400 and then the compressive force is released, tensile force acts on restraint members 500 that connect two end plates 400. As a reaction thereto, restraint members 500 press two end plates 400 in directions of bringing them closer to each other. As a result, restraint members 500 restrain the plurality of units 10 in the first direction (the Y direction).

Each of restraint members 500 includes a plate-shaped portion 510, a first flange portion 520, and second flange portions 530. Restraint member 500 is composed of iron, for example.

Plate-shaped portion 510 is a member extending in the Y direction. Plate-shaped portion 510 is provided with a plurality of openings 511. The plurality of openings 511 are provided at intervals in the Y direction. Each of openings 511 is constituted of a through hole extending through plate-shaped portion 510 in the X direction.

First flange portion 520 extends from beside the side surfaces of the plurality of units 10 so as to be located over the upper surfaces of the plurality of units 10. By providing first flange portion 520, rigidity of restraint member 500 formed to be relatively thin can be secured.

Second flange portions 530 are connected to both ends of plate-shaped portion 510 in the Y direction. Second flange portions 530 are fixed to end plates 400. Second flange portions 530 are fixed to end plates 400 by a known fixing method such as fastening of bolt, for example. Thus, restraint members 500 connect two end plates 400 to each other.

As shown in FIG. 2, lower restraint member 550 is provided on the bottom surfaces of the plurality of units 10 and end plates 400. Lower restraint member 550 protects below-described battery cells 100 from the bottom surface side. Lower restraint member 550 is composed of iron, for example.

As shown in FIG. 1, wiring member 600 is provided at a position facing the plurality of units 10 in the Z direction. Wiring member 600 extends in the Y direction through the center portion of each of the plurality of units 10 in the X direction. Wiring member 600 is electrically connected to the plurality of units 10. Wiring member 600 is, for example, a flexible printed circuit board.

Duct 700 extends in the Y direction. Duct 700 extends at a position overlapping with wiring member 600 when viewed in the Z direction. Duct 700 is disposed between each of the plurality of units 10 and wiring member 600 in the Z direction.

Connection terminals 800 are arranged on both sides beside the plurality of units 10 arranged side by side in the Y direction. Each of connection terminals 800 is provided at a position substantially overlapping with end plate 400 when viewed in the Z direction. Connection terminal 800 connects battery module 1 to an external wiring such as a cable (not shown) disposed outside battery module 1.

Figure 4:
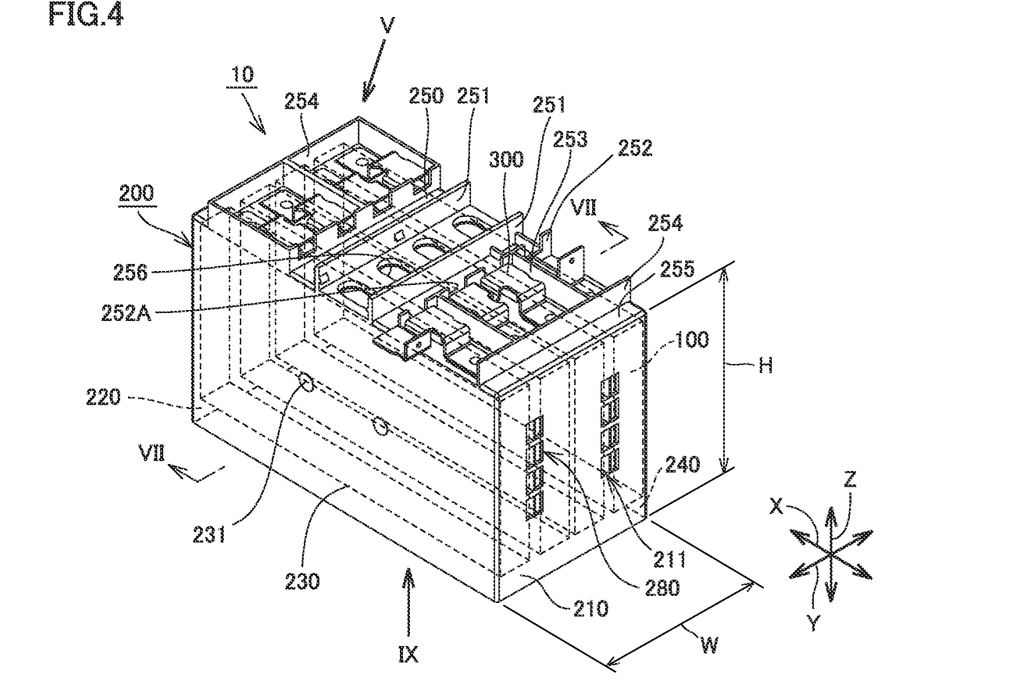
FIG. 4 is a perspective view showing the configuration of the unit included in the battery module according to the embodiment of the present technology.
Figure 5:
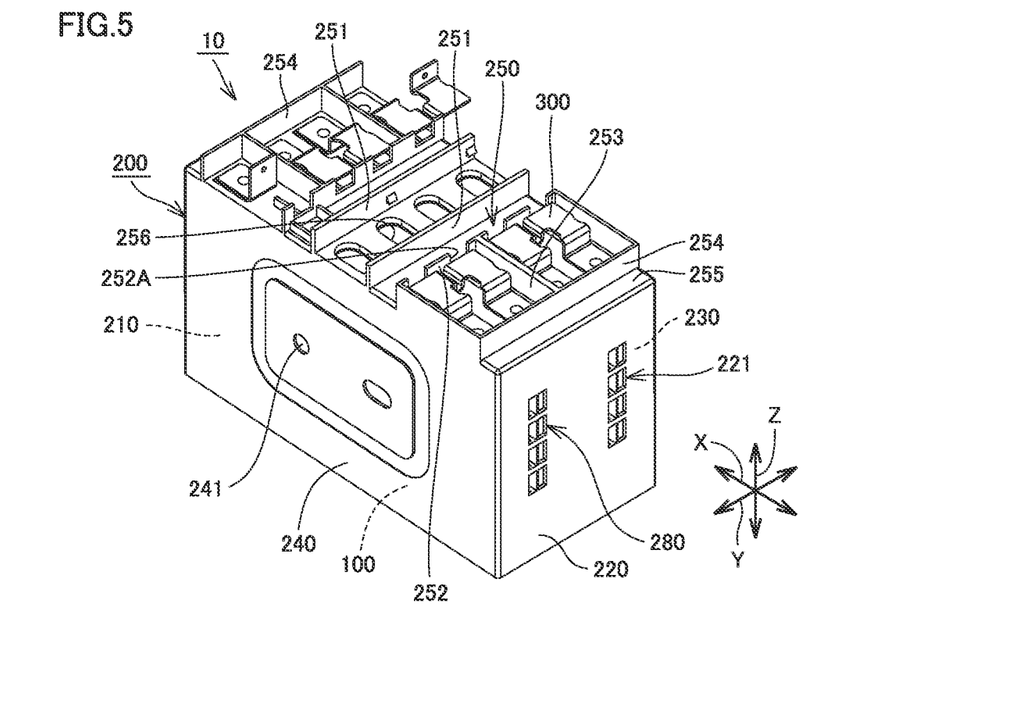
FIG. 5 is a perspective view of the unit of FIG. 4 when viewed in a direction of an arrow V.

Next, a structure of unit 10 serving as a battery unit will be described. FIG. 4 is a perspective view showing a configuration of the unit included in the battery module according to the embodiment of the present technology. FIG. 5 is a perspective view of the unit of FIG. 4 when viewed in a direction of an arrow V.

As shown in FIGS. 4 and 5, unit 10 includes a plurality of battery cells 100, a case 200 serving as a supporting member, and a bus bar 300.

Unit 10 includes two or more battery cells 100. Unit 10 according to one embodiment of the present technology includes four battery cells 100 as an even number of battery cells 100. It should be noted that the number of battery cells 100 included in each of the plurality of units 10 is not particularly limited as long as two or more battery cells 100 are included. Moreover, an odd number of battery cells 100 may be included in each of the plurality of units 10.

The plurality of battery cells 100 are arranged side by side in the first direction (V direction). Four battery cells 100 are arranged side by side in the Y direction as the plurality of battery cells 100 according to the embodiment of the present technology. The arrangement direction of the plurality of units 10 is the same as the arrangement direction of the plurality of battery cells 100 in each of the plurality of units 10.

Case 200 has an external appearance with a rectangular parallelepiped shape. Case 200 accommodates the plurality of battery cells 100. Case 200 is composed of, for example, a resin such as polypropylene. As shown in FIGS. 1 to 3, case 200 is compressed in the first direction (Y direction) by restraint members 500.

As shown in FIGS. 4 and 5, case 200 has a front wall portion 210, a rear wall portion 220, a first side wall portion 230, a second side wall portion 240, and an upper surface portion 250.

Front wall portion 210 is a surface adjacent to one of restraint members 500. As shown in FIG. 4, front wall portion 210 is provided with a plurality of first ventilation ports 211. Each of first ventilation ports 211 is a through hole extending through front wall portion 210 in the X direction.

Rear wall portion 220 is a surface facing front wall portion 210 with the plurality of battery cells 100 being interposed therebetween in the X direction. As shown in FIG. 5, rear wall portion 220 is provided with a plurality of second ventilation ports 221. Each of second ventilation ports 221 is a through hole extending through rear wall portion 220 in the X direction. Each of the plurality of second ventilation ports 221 communicates, through a below-described communication space 280, with a corresponding one of first ventilation ports 211 arranged side by side in the X direction.

First side wall portion 230 and second side wall portion 240 are arranged side by side in the first direction (Y direction), and face each other.

As shown in FIG. 4, first side wall portion 230 has a protrusion 231. Protrusion 231 protrudes opposite to second side wall portion 240. As shown in FIG. 5, second side wall portion 240 is provided with a recess 241. Recess 241 is recessed toward first side wall portion 230 and has a shape engageable with protrusion 231. In one unit 10, one or more pairs of protrusions 231 and recesses 241 are provided. Protrusion 231 and recess 241 of adjacent units 10 of the plurality of units 10 are engaged with each other.

Upper surface portion 250 includes first wall portions 251, second wall portions 252, third wall portions 253, fourth wall portions 254, engagement surfaces 255, and hole portions 256. Two first wall portions 251 are formed parallel to each other so as to extend in the Y direction at the center portion in the X direction. Second wall portions 252, third wall portions 253, and fourth wall portions 254 are provided on both sides beside first wall portions 251 in the X direction so as to define installation positions for bus bars 300. Each of second wall portions 252 is provided with a notch 252A through which a below-described voltage detection wire 610 extends. First flange portions 520 of restraint members 500 are engaged with engagement surfaces 255. Hole portions 256 communicate with below-described gas-discharge valves 130.

In each of the plurality of units 10, a width dimension W in the first direction (Y direction) is about 0.20 time or more and 3.30 times or less as large as a height dimension H in the second direction (Z direction). Specifically, width dimension W of each of front wall portion 210 and rear wall portion 220 of case 200 in the Y direction is about 0.20 time or more and 0.80 time or less as large as height dimension H of each of front wall portion 210 and rear wall portion 220. With this, unit 10 is likely to maintain a freestanding state as compared with a case where battery cells 100 are solely placed on the XY plane.

If unit 10 includes two battery cells 100, width dimension W is smaller than that in the case where unit 10 includes three or more battery cells 100. Even in the case where width dimension W is small, the freestanding state of unit 10 can be maintained by configuring in the following manner: width dimension W in the first direction (Y direction) with respect to the center of gravity of unit 10 is made larger than the width dimension of one battery cell 100 as described below when unit 10 is placed on the XY plane. In this way, the ratio of the width dimension of case 200 in the first direction (Y direction) to the height dimension of case 200 in the second direction (Z direction) can be larger than the ratio of the width dimension of one battery cell 100 in the first direction (Y direction) to the height dimension of one battery cell 100 in the second direction (Z direction), thereby maintaining the freestanding state of unit 10.

It should be noted that when the plurality of battery cells 100 supported by one case 200 are arranged side by side in the first direction (Y direction), the ratio of the width dimension of case 200 in the first direction (Y direction) to the height dimension of case 200 in the second direction (Z direction) may be larger than the ratio of the total value of the width dimensions of the plurality of battery cells 100 in the first direction (Y direction) to the height dimension of each of the plurality of battery cells 100 in the second direction (Z direction).

Each of bus bars 300 is composed of an electric conductor. The plurality of bus bars 300 electrically connect the plurality of battery cells 100 together.

Figure 6:
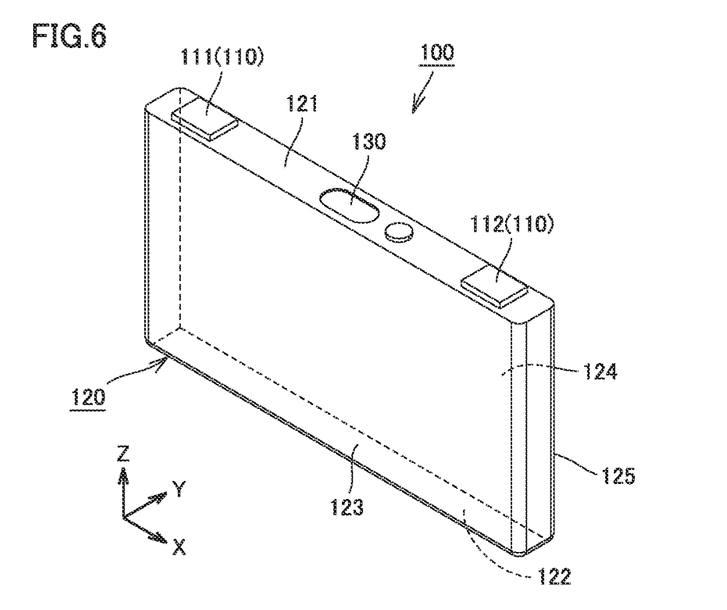
FIG. 6 is a perspective view showing a configuration of a battery cell included in the battery module according to the embodiment of the present technology.

FIG. 6 is a perspective view showing a configuration of a battery cell included in the battery module according to the embodiment of the present technology.

As shown in FIG. 6, battery cell 100 is, for example, a lithium ion battery. Battery cell 100 has a prismatic shape. Battery cell 100 has an output density of, for example, about 8000 W/L or more. Battery cell 100 has a voltage of, for example, about 1.0 V or more.

Battery cell 100 according to the present embodiment has electrode terminals 110, a housing 120, and a gas-discharge valve 130.

Electrode terminals 110 are formed on housing 120. Electrode terminals 110 have a positive electrode terminal 111 and a negative electrode terminal 112 as two electrode terminals 110 arranged side by side along the third direction (the X direction) orthogonal to the first direction (the Y direction).

Positive electrode terminal 111 and negative electrode terminal 112 are provided to be separated from each other in the X direction. Positive electrode terminal 111 and negative electrode terminal 112 are provided on both sides beside wiring member 600 and duct 700 in the X direction.

Housing 120 has a rectangular parallelepiped shape, and forms the external appearance of battery cell 100. An electrode assembly (not shown) and an electrolyte solution (not shown) are accommodated in housing 120.

Housing 120 includes an upper surface 121, a lower surface 122, a first side surface 123, a second side surface 124, and a third side surface 125.

Upper surface 121 is a flat surface orthogonal to the Z direction. Electrode terminals 110 are disposed on upper surface 121. Upper surface 121 is covered with upper surface portion 250 of case 200 serving as a supporting member. Lower surface 122 faces upper surface 121 along the second direction (Z direction) orthogonal to the first direction (Y direction).

Each of first side surface 123 and second side surface 124 is constituted of a flat surface orthogonal to the Y direction. Each of first side surface 123 and second side surface 124 has the largest area among the areas of the plurality of side surfaces of housing 120. Each of first side surface 123 and second side surface 124 has a rectangular shape when viewed in the Y direction. Each of first side surface 123 and second side surface 124 has a rectangular shape in which the X direction corresponds to the long-side direction and the Z direction corresponds to the short-side direction when viewed in the Y direction.

The plurality of battery cells 100 are stacked such that first side surfaces 123 of battery cells 100, 100 adjacent to each other in the Y direction face each other and second side surfaces 124 of battery cells 100, 100 adjacent to each other in the Y direction face each other. Thus, positive electrode terminals 111 and negative electrode terminals 112 are alternately arranged in the Y direction in which the plurality of battery cells 100 are stacked.

It should be noted that when an odd number of battery cells 100 are included in unit 10, the posture of unit 10 may be turned by 180° with respect to the Z axis between units 10 adjacent to each other in the Y direction.

Gas-discharge valve 130 is provided in upper surface 121. When internal pressure of housing 120 becomes more than or equal to a predetermined value due to gas generated inside housing 120, gas-discharge valve 130 discharges the gas to the outside of housing 120. The gas from gas-discharge valve 130 flows through duct 700 in FIG. 1 and is discharged to the outside of battery module 1.

Figure 7:
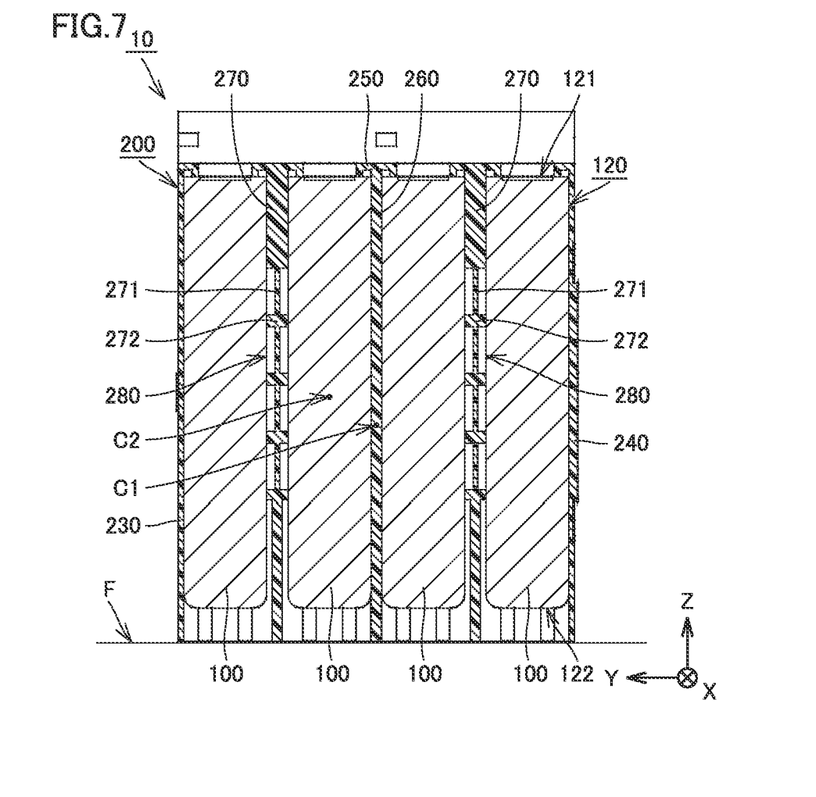
FIG. 7 is a cross sectional view of the unit of FIG. 4 when viewed in a direction of arrows of a line VII-VII.
Figure 8:
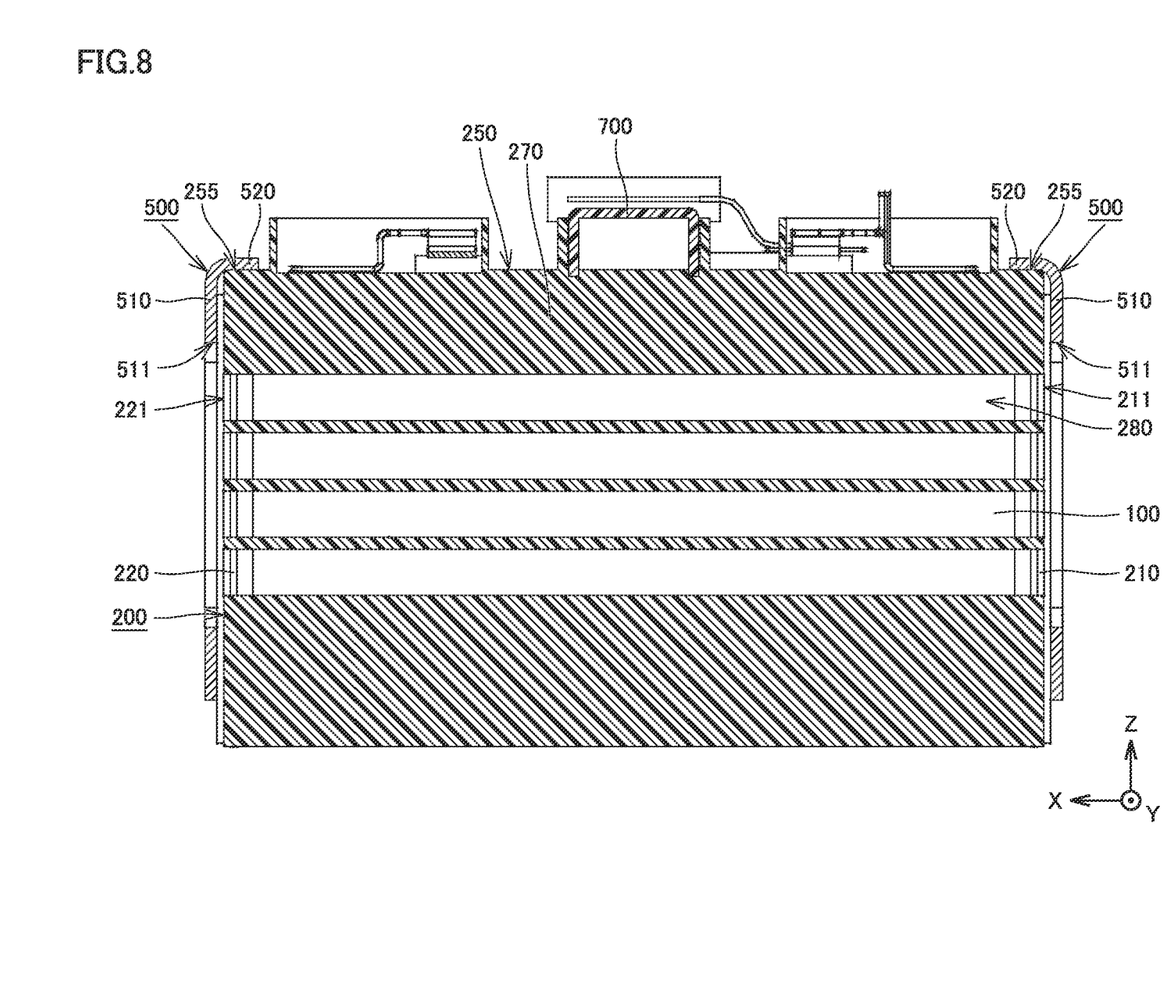
FIG. 8 is a cross sectional view of the battery module of FIG. 1 when viewed in a direction of arrows of a line VIII-VIII.

FIG. 7 is a cross sectional view of the unit of FIG. 4 when viewed in a direction of arrows of a line VII-VII. FIG. 8 is a cross sectional view of the battery module of FIG. 1 when viewed in a direction of arrows of a line VIII-VIII.

As shown in FIGS. 7 and 8, case 200 serving as a supporting member further has partition wall portions. Each of the partition wall portions is located between the plurality of battery cells 100. The partition wall portions according to the present embodiment have a first partition wall portion 260 and second partition wall portions 270.

As shown in FIG. 7, since battery cells 100 are sandwiched by first side wall portion 230, second side wall portion 240, first partition wall portion 260, and second partition wall portions 270 in case 200, battery cells 100 are supported in the first direction (Y direction). It should be noted that in the Y direction, the width of each of spaces in which battery cells 100 are disposed and which are defined by first side wall portion 230, second side wall portion 240, first partition wall portion 260, and second partition wall portions 270 may be narrower than the width of each battery cell 100 in order to restrain and support battery cell 100.

First partition wall portion 260 is located at substantially the center of unit 10 in the Y direction. First partition wall portion 260 in the present embodiment is disposed between two battery cells 100 arranged on the center side in the Y direction among four battery cells 100 accommodated in unit 10. First partition wall portion 260 is continuous in the Z direction inside case 200.

Second partition wall portions 270 are provided on both sides beside first partition wall portion 260 in the Y direction with battery cells 100 being interposed therebetween. Second partition wall portions 270 are continuous in the Z direction inside case 200.

Each of second partition wall portions 270 has thin portions 271 and ribs 272. Each of thin portions 271 is a portion of second partition wall portion 270 with a small thickness in the V direction. Four thin portions 271 are provided along the Z direction so as to be centered on the upper surface portion 250 side with respect to the center of second partition wall portion 270 in the Z direction. Ribs 272 are located among four thin portions 271.

A partition wall portion is provided with a communication space 280 extending in the third direction (X direction) intersecting the first direction (Y direction) and the second direction (Z direction). Regarding the partition wall portions according to the present embodiment, a plurality of communication spaces 280 are provided in second partition wall portions 270. Since thin portions 271 and ribs 272 are formed in second partition wall portions 270, communication spaces 280 communicate inside case 200 in which battery cells 100 are accommodated. Communication spaces 280 communicate with first ventilation ports 211 and second ventilation ports 221.

At least part of communication spaces 280 is located on the upper surface 121 side with respect to the center between upper surface 121 and lower surface 122 of housing 120. In the embodiment of the present technology, two communication spaces 280 provided on the upper surface 121 side among four communication spaces 280 arranged side by side in the Z direction are located on the upper surface 121 side with respect to the center between upper surface 121 and lower surface 122.

As shown in FIG. 8, communication spaces 280 are continuous to openings 511 in the third direction (X direction). Thus, by introducing cooling air from first ventilation ports 211 or second ventilation ports 221 and allowing the cooling air to flow through communication spaces 280, battery cells 100 accommodated in case 200 can be cooled.

Restraint members 500 have respective portions engaged with upper surface portion 250. In restraint members 500 according to the embodiment of the present technology, first flange portions 520 are engaged with engagement surfaces 255 located at both ends of upper surface portion 250 in the X direction. With this, a positional relation can be readily secured between each of the plurality of units 10 and each of restraint members 500 so as to allow communication spaces 280 and openings 511 to be continuous.

Figure 9:
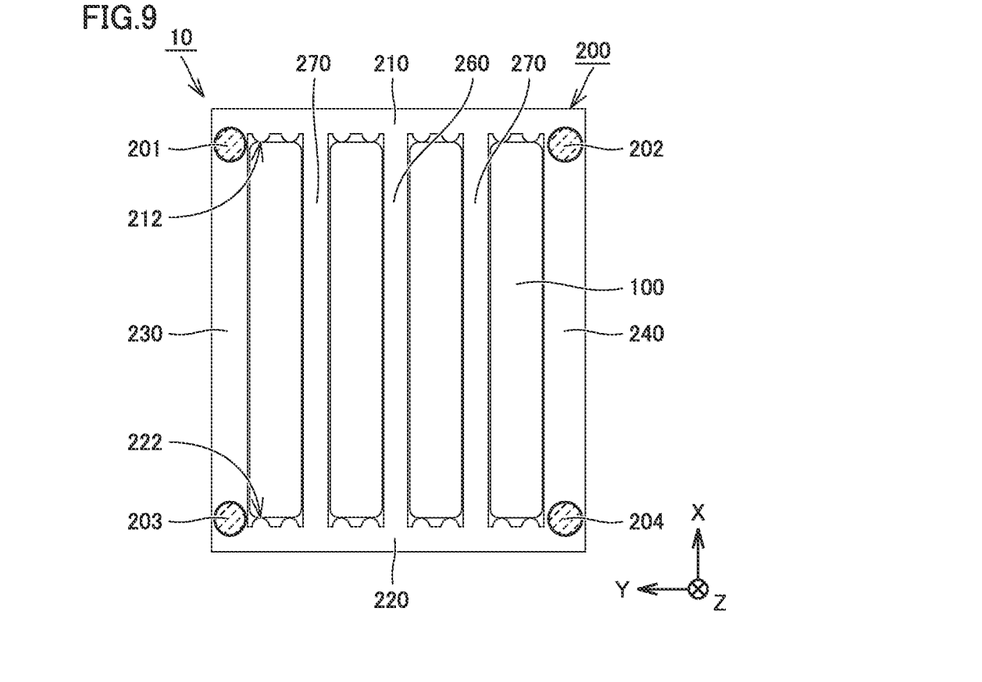
FIG. 9 is a bottom view showing the configuration of the unit included in the battery module according to the embodiment of the present technology.

FIG. 9 is a bottom view showing the configuration of the unit included in the battery module according to the embodiment of the present technology.

As shown in FIG. 9, front wall portion 210 of case 200 serving as a supporting member further has first protuberances 212. First protuberances 212 protrude in front wall portion 210 on the side on which battery cells 100 are disposed. The plurality of first protuberances 212 are arranged side by side in the Y direction. Each of the plurality of first protuberances 212 is continuous in the Z direction at front wall portion 210.

Rear wall portion 220 further has second protuberances 222. Second protuberances 222 protrude in rear wall portion 220 on the side on which battery cells 100 are disposed. The plurality of second protuberances 222 are arranged side by side in the Y direction. Each of the plurality of second protuberances 222 is continuous in the Z direction at rear wall portion 220.

Case 200 supports the plurality of battery cells 100 in the third direction (X direction). In case 200 according to the embodiment of the present technology, battery cells 100 are sandwiched by first protuberances 212 and second protuberances 222 in the third direction (X direction), thereby supporting the plurality of battery cells 100.

Case 200 serving as a supporting member can support the plurality of battery cells 100 such that when each of the plurality of units 10 is placed on a first plane F (XY plane), the second direction (Z direction) is substantially parallel to the normal direction of first plane F (XY plane) and electrode terminals 110 are oriented in a direction away from first plane F (XY plane).

Specifically, case 200 has a first region 201, a second region 202, a third region 203, and a fourth region 204 on the bottom portion side. The rear surface of case 200 can be formed to be flat, or protuberances or surfaces having the same height can be provided at first region 201, second region 202, third region 203, and fourth region 204. As a result, case 200 is supported by first region 201, second region 202, third region 203, and fourth region 204, and therefore can be freestanding on first plane F (XY plane) as shown in FIG. 7. Thus, case 200 can support the plurality of battery cells 100 to be in the upright state. It should be noted that case 200 according to the embodiment of the present technology is configured to be supported by the four regions, i.e., first region 201, second region 202, third region 203, and fourth region 204; however, it is not limited to this configuration and case 200 can be supported by three or more regions.

It should be noted that case 200 according to the embodiment of the present technology supports battery cells 100 in the X direction and the Y direction; however, it is not limited to this configuration and case 200 may be configured to support battery cells 100 only in the Y direction. Further, case 200 serving as a supporting member according to the embodiment of the present technology may be constituted of a sheet in the form of a pouch as long as a certain number of battery cells 100 can be handled collectively.

Figure 10:
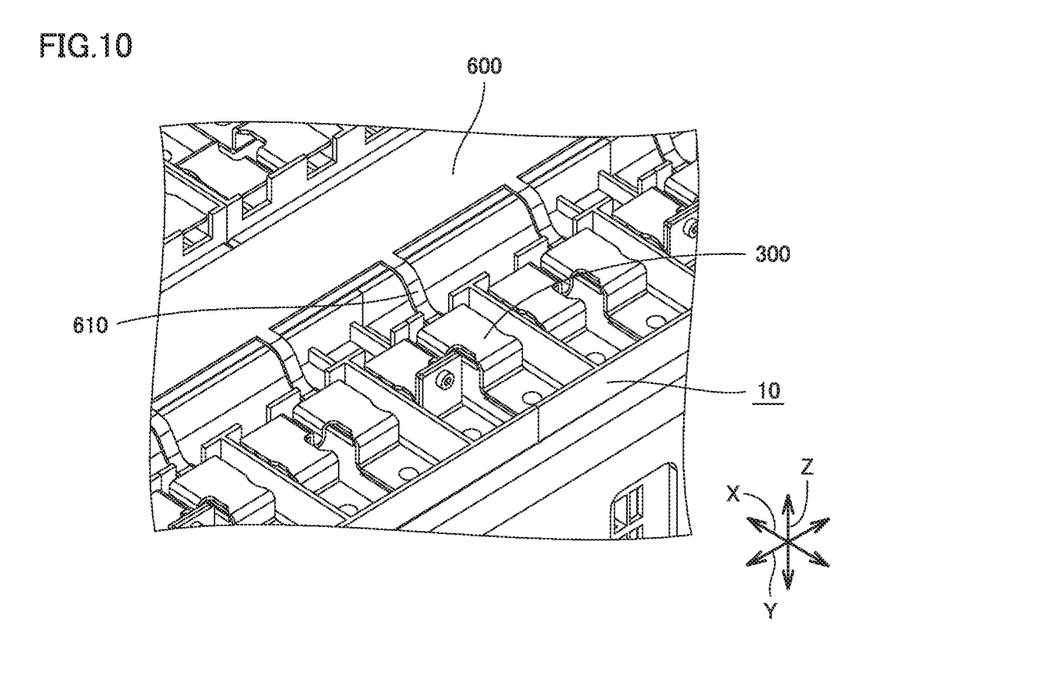
FIG. 10 is a partial perspective view showing a configuration of a voltage detection wire included in the battery module according to the embodiment of the present technology.

FIG. 10 is a partial perspective view showing a configuration of each voltage detection wire included in the battery module according to the embodiment of the present technology.

As shown in FIG. 10, wiring member 600 includes voltage detection wires 610 that each detects a voltage. The plurality of voltage detection wires 610 extend to and are connected to bus bars 300. At least one voltage detection wire 610 is disposed in each of the plurality of units 10. In the present embodiment, one voltage detection wire 610 is disposed in each of the plurality of units 10. Thus, voltage detection wire 610 can detect the voltage of unit 10.

Figure 11:
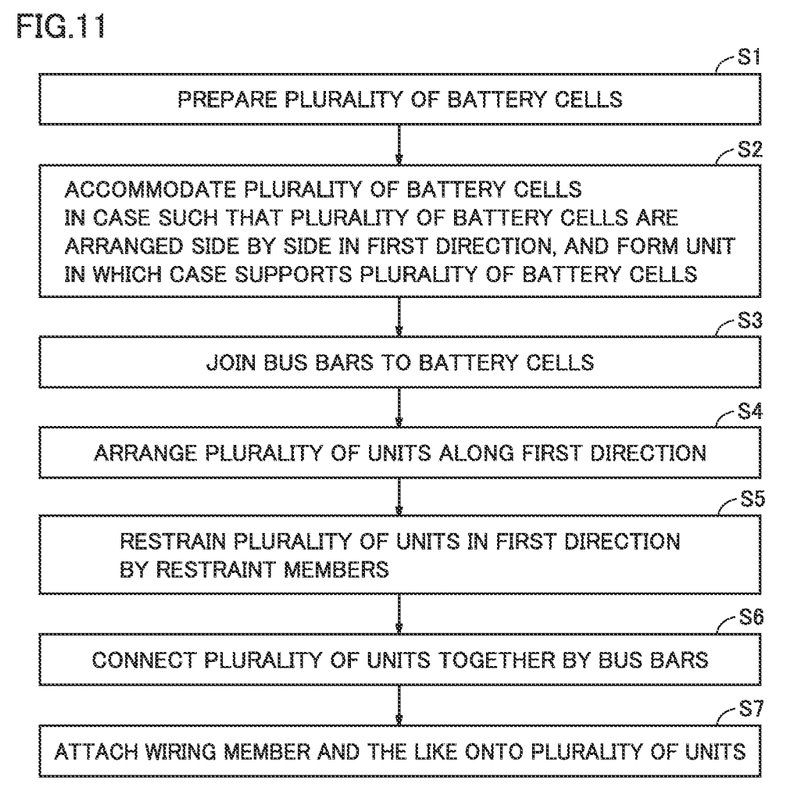
FIG. 11 is a flowchart showing a method of manufacturing the battery module according to the embodiment of the present technology.

Hereinafter, a method of manufacturing the battery module according to the embodiment of the present technology will be described. FIG. 11 is a flowchart showing a method of manufacturing the battery module according to the embodiment of the present technology.

As shown in FIG. 11, in the method of manufacturing the battery module according to the embodiment of the present technology, first, a plurality of battery cells 100 each having a prismatic shape are prepared (step S1).

Next, the plurality of battery cells 100 are accommodated in a case 200 such that the plurality of battery cells 100 are arranged side by side in the first direction (Y direction), and a unit 10 in which case 200 supports the plurality of battery cells 100 is formed (step S2).

Next, bus bars 300 are joined to battery cells 100 of the plurality of units 10 (step S3). Bus bars 300 of the present embodiment are joined to electrode terminals 110 of battery cells 100 by, for example, laser welding.

Next, a plurality of such units 10 are arranged along the first direction (Y direction) (step S4). In each of units 10 according to the present embodiment, center of gravity C1 of case 200 can be lower than center of gravity C2 of each battery cell 100 shown in FIG. 7 as compared with a case where battery cell 100 is solely freestanding as shown in FIG. 6 and width dimension W in the first direction (Y direction) with respect to the center of gravity of unit 10 can be larger than the width dimension of one battery cell 100, with the result that the freestanding state of unit 10 is likely to be maintained.

Next, the plurality of units 10 are restrained in the first direction (Y direction) by restraint members 500 (step S5). It should be noted that when battery cells 100 are restrained in the first direction (Y direction) by case 200 in advance, not only restraint force by restraint members 500 but also restraint force by case 200 can be applied to battery cells 100 for restraint force necessary for restraining battery cells 100 finally. Thus, the restraint force for restraining the plurality of units 10 by restraint members 500 can be smaller than the restraint force in the case where battery cells 100 are not restrained by case 200. As a result, compression force of a jig when compressing the plurality of units 10 in the Y direction by the jig can be small, thus resulting in downsizing of the jig. It should be noted that the plurality of units 10 in the present embodiment are restrained by restraint members 500 and are therefore fixed together; however, it is not limited to this configuration.

Next, the plurality of units 10 are connected together by bus bars 300 (step S6). Specifically, bus bars 300 disposed in the plurality of units 10 are connected by welding, fastening of bolt, or the like.

Next, a wiring member 600, a duct 700, and connection terminals 800 are attached onto the plurality of units 10 (step S7). Battery module 1 formed by the above-described manufacturing method is accommodated in a battery pack.

In battery module 1 and the battery unit according to the embodiment of the present technology, since case 200 serving as a supporting member in unit 10 is capable of supporting the plurality of battery cells 100 such that when unit 10 is placed on first plane F (XY plane), the second direction (Z direction) is substantially parallel to the normal direction of first plane F (XY plane) and electrode terminal 110 is oriented in the direction away from first plane F (XY plane), unit 10 can be freestanding, with the result that the upright state of battery cell 100 can be readily maintained in the manufacturing process for battery module 1.

In battery module 1 and the battery unit according to the embodiment of the present technology, when unit 10 is placed on first plane F (XY plane), when width dimension W in the first direction (Y direction) with respect to the center of gravity of unit 10 is larger than the width dimension of one battery cell 100, unit 10 can be facilitated to be freestanding, with the result that the upright state of battery cell 100 can be readily maintained in the manufacturing process for battery module 1.

In battery module 1 and the battery unit according to the embodiment of the present technology, since communicating space 280 is provided in second partition wall portion 270 of case 200 serving as a supporting member, unit 10 can be facilitated to be freestanding with width dimension W in the first direction (Y direction) being larger than the width dimension of one battery cell 100 when unit 10 is placed on first plane F (XY plane), with the result that the upright state of battery cell 100 can be readily maintained in the manufacturing process for battery module 1.

In battery module 1 according to the embodiment of the present technology, communication space 280 of unit 10 and opening 511 of restraint member 500 are continuous to allow cooling air to flow therethrough, thereby cooling battery cells 100 accommodated in case 200.

In battery module 1 according to the embodiment of the present technology, first flange portion 520 of restraint member 500 and engagement surface 255 of case 200 serving as a supporting member are engaged with each other, with the result that a positional relation can be facilitated to be secured between each of the plurality of units 10 and restraint member 500 so as to attain continuity between communication space 280 and opening 511.

In battery module 1 and the battery unit according to the embodiment of the present technology, since width dimension W in the first direction (Y direction) in unit 10 is about 0.20 time or more and 3.30 times or less as large as height dimension H in the second direction (Z direction), the installation area of unit 10 can be sufficiently secured with respect to first plane F (XY plane) when unit 10 is placed on first plane F (XY plane), with the result that the upright state of battery cell 100 can be readily maintained in the manufacturing process for battery module 1.

In battery module 1 and the battery unit according to the embodiment of the present technology, one unit 10 includes two or more battery cells 100, and each of two or more battery cells 100 is set to have an output density of about 8000 W/L or more, with the result that a power supply device having a predetermined voltage or more can be formed with each unit 10 being handled as a unit.

Hereinafter, a battery module according to a modification of the embodiment of the present technology will be described. Since the battery module according to the present modification is different from battery module 1 according to the embodiment of the present technology in terms of the configuration of the case serving as the supporting member of the unit, the same configurations as those in battery module 1 according to the embodiment of the present technology will not be described repeatedly.

Figure 12:
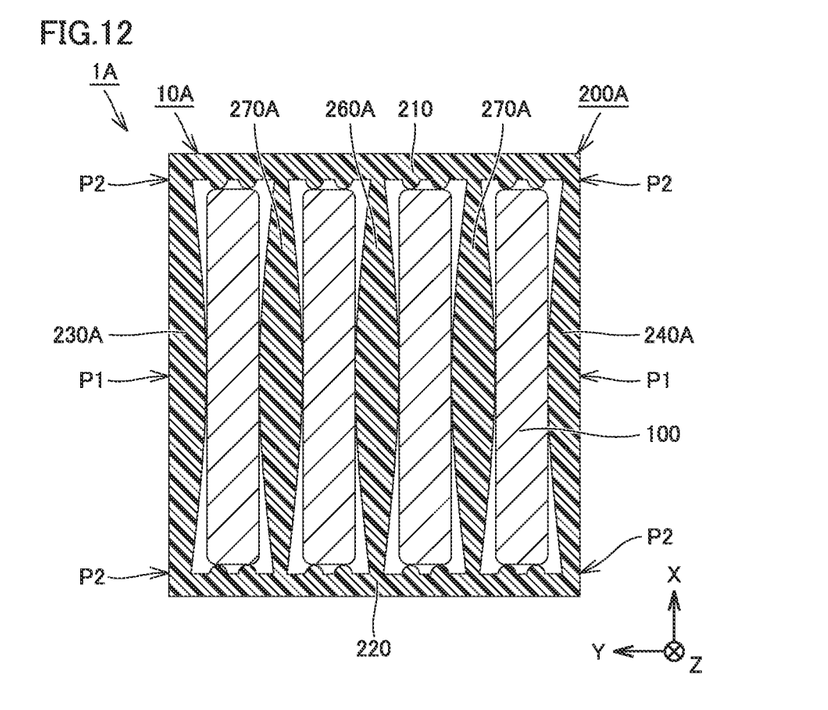
FIG. 12 is a cross sectional view showing a configuration of a unit included in a battery module according to a modification of the present technology.

FIG. 12 is a cross sectional view showing a configuration of a unit included in a battery module according to a modification of the present technology. As shown in FIG. 12, a unit 10A included in a battery module 1A according to the present modification includes a battery cells 100 and a case 200A as a supporting member.

Case 200A has a front wall portion 210, a rear wall portion 220, a first side wall portion 230A, a second side wall portion 240A, an upper surface portion, a first partition wall portion 260A, and second partition wall portions 270A.

Center P1 of first side wall portion 230A is curved to protrude toward the second partition wall portion 270A side in the Y direction with respect to both ends P2 thereof in the X direction. Center P1 of second side wall portion 240A is curved to protrude toward the second partition wall portion 270A side in the Y direction with respect to both ends P2 thereof in the X direction. Center P1 of first partition wall portion 260A is curved to protrude toward both sides in the Y direction with respect to both ends P2 thereof in the X direction. Center P1 of each second partition wall portion 270A in the X direction is curved to protrude toward both sides in the Y direction with respect to both ends P2 thereof in the X direction.

In the Y direction, the width of each of spaces in which battery cells 100 are disposed and which are defined by first side wall portion 230A, second side wall portion 240A, first partition wall portion 260A, and second partition wall portions 270A is narrower in the direction from each of both ends P2 in the X direction toward center P1. Each of the plurality of battery cells 100 is supported by case 200A at center P1 in the X direction.

In battery module 1A according to the modification of the embodiment of the present technology, since the positions at which the plurality of battery cells 100 are supported in case 200A serving as a supporting member are located at center P1 in the X direction, the center portions of the plurality of battery cells 100 in the X direction, which are likely to be expanded due to use of battery cells 100, can be effectively supported.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery module comprising:
    a plurality of units arranged side by side in a first direction; and
    a restraint member that restrains the plurality of units in the first direction, wherein
    each of the plurality of units includes
        a plurality of battery cells arranged side by side in the first direction, each of the plurality of battery cells having a prismatic shape, and
        a supporting member that supports the plurality of battery cells,
    each of the plurality of battery cells has a housing having an upper surface on which an electrode terminal is disposed and a lower surface facing the upper surface along a second direction orthogonal to the first direction,
    the supporting member is configured to support the plurality of battery cells such that when each of the plurality of units is placed on a first plane, the second direction is substantially parallel to a normal direction of the first plane and the electrode terminal is oriented in a direction away from the first plane, with each of the plurality of units being freestanding on the first plane,
    the supporting member is configured to support the plurality of the battery cells in an upright state and arranged along the first direction, and
    the supporting member includes a front wall portion and a rear wall portion each extending along a plane including the first direction and the second direction, the front wall portion or the rear wall portion has a plurality of protuberances, the plurality of protuberances protrude from the front wall portion or the rear wall portion toward a side on which the plurality of the battery cells are disposed, the plurality of protuberances are arranged side by side in the first direction, and the plurality of protuberances continuously extend in the second direction at the front wall portion or the rear wall portion.

2. The battery module according to claim 1, wherein
    the supporting member has a partition wall portion located between the plurality of battery cells,
    the partition wall portion is provided with a communication space extending in a third direction intersecting the first direction and the second direction,
    the restraint member is provided with an opening continuous to the communication space in the third direction, and
    the housing of each of the plurality of battery cells has a rectangular parallelepiped shape including a side surface extending orthogonal to the upper surface, both the front wall portion and the rear wall portion have a plurality of protuberances, the plurality of battery cells are sandwiched by the protuberances in the third direction, thereby supporting the plurality of battery cells in the third direction.

3. The battery module according to claim 2, wherein
    the supporting member has an upper surface portion that covers the upper surface of the housing, and
    the restraint member has a portion engaged with the upper surface portion.

4. The battery module according to claim 1, wherein
    the supporting member has an upper surface portion that covers the upper surface of the housing, and the restraint member has a portion engaged with the upper surface portion.

5. The battery module according to claim 1, wherein in each of the plurality of units, a width dimension in the first direction is 0.20 time or more and 3.30 times or less as large as a height dimension in the second direction.

6. The battery module according to claim 1, wherein
each of the plurality of units includes two or more battery cells, and
each of the two or more battery cells has an output density of 8000 W/L or more.

7. A battery module comprising:
a plurality of units arranged side by side in a first direction; and
a restraint member that restrains the plurality of units in the first direction, wherein
each of the plurality of units includes
a plurality of battery cells arranged side by side in the first direction, each of the plurality of battery cells having a prismatic shape, and
a supporting member that supports the plurality of battery cells,
each of the plurality of battery cells has a housing having an upper surface on which an electrode terminal is disposed and a lower surface facing the upper surface along a second direction orthogonal to the first direction, with each of the plurality of units being freestanding on a first plane,
when each of the plurality of units is placed on the first plane, a ratio of a width dimension of the supporting member in the first direction to a height dimension of the supporting member in the second direction is larger than a ratio of a width dimension of each battery cell in the first direction to a height dimension of the battery cell in the second direction,
the supporting member is configured to support the plurality of the battery cells in an upright state and arranged along the first direction, and
the supporting member includes a front wall portion and a rear wall portion each extending along a plane including the first direction and the second direction, the front wall portion or the rear wall portion has a plurality of protuberances, the plurality of protuberances protrude from the front wall portion or the rear wall portion toward a side on which the plurality of the battery cells are disposed, the plurality of protuberances are arranged side by side in the first direction, and the plurality of protuberances continuously extend in the second direction at the front wall portion or the rear wall portion.

8. The battery module according to claim 7, wherein
the supporting member has a partition wall portion located between the plurality of battery cells,
the partition wall portion is provided with a communication space extending in a third direction intersecting the first direction and the second direction,
the restraint member is provided with an opening continuous to the communication space in the third direction, and
the housing of each of the plurality of battery cells has a rectangular parallelepiped shape including a side surface extending orthogonal to the upper surface, both the front wall portion and the rear wall portion have a plurality of protuberances, the plurality of battery cells are sandwiched by the protuberances in the third direction, thereby supporting the plurality of battery cells in the third direction.

9. The battery module according to claim 8, wherein
the supporting member has an upper surface portion that covers the upper surface of the housing, and
the restraint member has a portion engaged with the upper surface portion.

10. The battery module according to claim 7, wherein
the supporting member has an upper surface portion that covers the upper surface of the housing, and
the restraint member has a portion engaged with the upper surface portion.

11. A battery module comprising:
a plurality of units arranged side by side in a first direction; and
a restraint member that restrains the plurality of units in the first direction, wherein
each of the plurality of units includes
a plurality of battery cells arranged side by side in the first direction, each of the plurality of battery cells having a prismatic shape, and
a supporting member that supports the plurality of battery cells,
each of the plurality of battery cells has a housing having an upper surface on which an electrode terminal is disposed and a lower surface facing the upper surface along a second direction orthogonal to the first direction, with each of the plurality of units being freestanding on a first plane,
the supporting member has a partition wall portion located between the plurality of battery cells,
the partition wall portion is provided with communication spaces each extending in a third direction intersecting the first direction and the second direction,
at least part of the communication spaces is located on the upper surface side with respect to a center between the upper surface and the lower surface of the housing,
the supporting member is configured to support the plurality of the battery cells in an upright state and arranged along the first direction, and
the supporting member includes a front wall portion and a rear wall portion each extending along a plane including the first direction and the second direction, the front wall portion or the rear wall portion has a plurality of protuberances, the plurality of protuberances protrude from the front wall portion or the rear wall portion toward a side on which the plurality of the battery cells are disposed, the plurality of protuberances are arranged side by side in the first direction, and the plurality of protuberances continuously extend in the second direction at the front wall portion or the rear wall portion.

12. The battery module according to claim 11, wherein the restraint member is provided with an opening continuous to each of the communication spaces in the third direction, and
the housing of each of the plurality of battery cells has a rectangular parallelepiped shape including a side surface extending orthogonal to the upper surface, both the front wall portion and the rear wall portion have a plurality of protuberances, the plurality of battery cells are sandwiched by the protuberances in the third direction, thereby supporting the plurality of battery cells in the third direction.

13. The battery module according to claim 12, wherein
the supporting member has an upper surface portion that covers the upper surface of the housing, and
the restraint member has a portion engaged with the upper surface portion.

14. The battery module according to claim 11, wherein
the supporting member has an upper surface portion that covers the upper surface of the housing, and
the restraint member has a portion engaged with the upper surface portion.

15. A battery unit comprising:
a plurality of battery cells arranged side by side in a first direction, each of the plurality of battery cells having a prismatic shape; and
a supporting member that supports the plurality of battery cells, wherein
each of the plurality of battery cells includes a housing having an upper surface on which an electrode terminal is disposed and a lower surface facing the upper surface along a second direction orthogonal to the first direction, with the battery unit being freestanding on a first plane,
the supporting member includes a first side wall portion and a second side wall portion arranged side by side in the first direction and facing each other,
the first side wall portion has a protrusion that protrudes opposite to the second side wall portion,
the second side wall portion is provided with a recess that is recessed toward the first side wall portion and that has a shape engageable with the protrusion,
the supporting member is configured to support the plurality of battery cells such that when the battery unit is placed on the first plane, the second direction is substantially parallel to a normal direction of the first plane and the electrode terminal is oriented in a direction away from the first plane,
the supporting member is configured to support the plurality of the battery cells in an upright state and arranged along the first direction, and
the supporting member includes a front wall portion and a rear wall portion each extending along a plane including the first direction and the second direction, the front wall portion or the rear wall portion has a plurality of protuberances, the plurality of protuberances protrude from the front wall portion or the rear wall portion toward a side on which the plurality of the battery cells are disposed, the plurality of protuberances are arranged side by side in the first direction, and the plurality of protuberances continuously extend in the second direction at the front wall portion or the rear wall portion.

16. The battery unit according to claim 15, wherein in the battery unit, a width dimension in the first direction is 0.20 time or more and 3.30 times or less as large as a height dimension in the second direction.

17. The battery unit according to claim 15, comprising two or more battery cells, wherein
each of the two or more battery cells has an output density of 8000 W/L or more.

18. A battery unit comprising:
a plurality of battery cells arranged side by side in a first direction, each of the plurality of battery cells having a prismatic shape; and
a supporting member that supports the plurality of battery cells, wherein
each of the plurality of battery cells includes a housing having an upper surface on which an electrode terminal is disposed and a lower surface facing the upper surface along a second direction orthogonal to the first direction, with the battery unit being freestanding on a first plane,
the supporting member includes a first side wall portion and a second side wall portion arranged side by side in the first direction and facing each other,
the first side wall portion has a protrusion that protrudes opposite to the second side wall portion,
the second side wall portion is provided with a recess that is recessed toward the first side wall portion and that has a shape engageable with the protrusion,
when the battery unit is placed on the first plane, a ratio of a width dimension of the supporting member in the first direction to a height dimension of the supporting member in the second direction is larger than a ratio of a width dimension of each battery cell in the first direction to a height dimension of the battery cell in the second direction,
the supporting member is configured to support the plurality of the battery cells in an upright state and arranged along the first direction, and
the supporting member includes a front wall portion and a rear wall portion each extending along a plane including the first direction and the second direction, the front wall portion or the rear wall portion has a plurality of protuberances, the plurality of protuberances protrude from the front wall portion or the rear wall portion toward a side on which the plurality of the battery cells are disposed, the plurality of protuberances are arranged side by side in the first direction, and the plurality of protuberances continuously extend in the second direction at the front wall portion or the rear wall portion.

19. A battery unit comprising:
a plurality of battery cells arranged side by side in a first direction, each of the plurality of battery cells having a prismatic shape; and
a supporting member that supports the plurality of battery cells, wherein
each of the plurality of battery cells includes a housing having an upper surface on which an electrode terminal is disposed and a lower surface facing the upper surface along a second direction orthogonal to the first direction, with the battery unit being freestanding on a first plane,
the supporting member includes
a first side wall portion and a second side wall portion arranged side by side in the first direction and facing each other, and
a partition wall portion located between the plurality of battery cells,
the first side wall portion has a protrusion that protrudes opposite to the second side wall portion,
the second side wall portion is provided with a recess that is recessed toward the first side wall portion and that has a shape engageable with the protrusion,
the partition wall portion is provided with communication spaces each extending in a third direction intersecting the first direction and the second direction,
at least part of the communication spaces is located on the upper surface side with respect to a center between the upper surface and the lower surface of the housing,
the supporting member is configured to support the plurality of the battery cells in an upright state and arranged along the first direction, and
the supporting member includes a front wall portion and a rear wall portion each extending along a plane including the first direction and the second direction, the front wall portion or the rear wall portion has a plurality of protuberances, the plurality of protuberances protrude from the front wall portion or the rear wall portion toward a side on which the plurality of the battery cells are disposed, the plurality of protuberances are arranged side by side in the first direction, and the plurality of protuberances continuously extend in the second direction at the front wall portion or the rear wall portion.

* * * * *